(12) United States Patent
Lo et al.

(10) Patent No.: US 9,656,187 B2
(45) Date of Patent: May 23, 2017

(54) FUEL DEOXYGENATION SYSTEM CONTACTOR-SEPARATOR

(71) Applicant: HONEYWELL INTERNATIONAL INC., Morristown, NJ (US)

(72) Inventors: Charles Lo, Peoria, AZ (US); Dan Laboda, Niles, MI (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 75 days.

(21) Appl. No.: 14/539,279

(22) Filed: Nov. 12, 2014

(65) Prior Publication Data
US 2016/0129372 A1    May 12, 2016

(51) Int. Cl.
*B01D 19/00* (2006.01)

(52) U.S. Cl.
CPC ................ *B01D 19/0057* (2013.01)

(58) Field of Classification Search
CPC .................................. B01D 19/0057
See application file for complete search history.

(56) References Cited

U.S. PATENT DOCUMENTS

| | | | | |
|---|---|---|---|---|
| 1,734,507 A | * | 11/1929 | Westling | B01D 19/0057 159/4.07 |
| 2,468,070 A | * | 4/1949 | Hunter | B01D 17/0217 210/196 |
| 2,575,568 A | | 11/1951 | Topanelian, Jr. | |
| 2,941,619 A | * | 6/1960 | Sochor | B01D 45/16 96/208 |
| 3,233,389 A | | 2/1966 | Dahlen | |
| 3,359,708 A | * | 12/1967 | Barber | B01D 19/0057 96/167 |
| 3,507,479 A | * | 4/1970 | Pearl | B01D 47/16 159/17.3 |

(Continued)

FOREIGN PATENT DOCUMENTS

| | | |
|---|---|---|
| AU | 573534 | 8/1983 |
| EP | 0475930 A1 | 3/1992 |

(Continued)

OTHER PUBLICATIONS

USPTO Office Action for U.S. Appl. No. 14/310,531 dated Jun. 30, 2016.

(Continued)

*Primary Examiner* — Amber R Orlando
*Assistant Examiner* — Britanny Precht
(74) *Attorney, Agent, or Firm* — Lorenz & Kopf, LLP (57) ABSTRACT

A fuel deoxygenation system contactor-separator includes a fuel-gas mixture inlet section, a fuel outlet section, a gas outlet, a spiral contactor-separator, and a valve element. The fuel-gas mixture inlet section has a fuel-gas mixture inlet port. The fuel outlet section has a fuel outlet port. The gas outlet section has a gas outlet port. The spiral contactor-separator conduit has an inner wall and an outer wall that defines a spiral contactor-separator flow passage. The spiral contactor-separator conduit is coupled to, and is in fluid communication with, the fuel-gas mixture inlet section, the fuel outlet section, and the gas outlet section. The valve element is disposed between the fuel outlet port and the gas outlet port and is movable between a first position and a second position.

19 Claims, 11 Drawing Sheets

(56) References Cited

U.S. PATENT DOCUMENTS

| | | | |
|---|---|---|---|
| 3,663,117 A | 5/1972 | Warren | |
| 3,691,730 A | 9/1972 | Hickey et al. | |
| 3,706,383 A * | 12/1972 | Palma | B01D 45/16 209/434 |
| 3,788,039 A | 1/1974 | Bragg | |
| 3,847,298 A | 11/1974 | Hamilton | |
| 3,867,056 A * | 2/1975 | Carle | F04D 1/06 415/169.1 |
| 3,948,626 A | 4/1976 | Bragg | |
| 4,017,276 A | 4/1977 | Bloem | |
| 4,070,168 A * | 1/1978 | Beattie | B01D 19/0057 210/304 |
| 4,190,030 A | 2/1980 | Chester | |
| 4,890,980 A | 1/1990 | Heald et al. | |
| 4,895,683 A | 1/1990 | Iwasaki | |
| 4,900,335 A | 2/1990 | Algers | |
| 5,061,151 A | 10/1991 | Steiger | |
| 5,112,357 A | 5/1992 | Bjerklund et al. | |
| 5,207,734 A | 5/1993 | Day et al. | |
| 5,316,682 A | 5/1994 | Keyser et al. | |
| 5,405,497 A | 4/1995 | Torregrossa | |
| 5,472,567 A | 12/1995 | Torregrossa | |
| 5,522,917 A | 6/1996 | Honda et al. | |
| 5,529,701 A | 6/1996 | Grisham et al. | |
| 5,531,904 A | 7/1996 | Grisham et al. | |
| 5,662,811 A | 9/1997 | Grisham et al. | |
| 5,858,283 A | 1/1999 | Burris | |
| 5,863,031 A | 1/1999 | Veeder et al. | |
| 6,004,386 A | 12/1999 | Grisham et al. | |
| 6,053,249 A | 4/2000 | Stevenson et al. | |
| 6,295,972 B1 * | 10/2001 | Radue | F02M 37/0047 123/300 |
| 6,315,815 B1 | 11/2001 | Spadaccini et al. | |
| 6,423,235 B1 | 7/2002 | Shimoi et al. | |
| 6,431,528 B1 | 8/2002 | Kojima | |
| 6,660,067 B2 | 12/2003 | Stacy et al. | |
| 6,709,492 B1 | 3/2004 | Spadaccini et al. | |
| 6,822,125 B2 | 11/2004 | Lee et al. | |
| 6,830,608 B1 | 12/2004 | Peters | |
| 6,918,949 B1 | 7/2005 | Peters | |
| 6,939,392 B2 | 9/2005 | Huang et al. | |
| 7,093,437 B2 | 8/2006 | Spadaccini et al. | |
| 7,104,530 B2 | 9/2006 | Boye | |
| 7,153,343 B2 | 12/2006 | Burlatsky et al. | |
| 7,186,328 B1 | 3/2007 | Schultz et al. | |
| 7,231,768 B2 | 6/2007 | Spadaccini et al. | |
| 7,260,926 B2 | 8/2007 | Sabatino et al. | |
| 7,264,655 B2 | 9/2007 | Joynson | |
| 7,326,283 B2 | 2/2008 | Gardner et al. | |
| 7,806,966 B2 | 10/2010 | Bose | |
| 7,819,275 B2 | 10/2010 | Stodd et al. | |
| 7,892,321 B2 | 2/2011 | Aagesen et al. | |
| 7,896,292 B2 | 3/2011 | Limaye et al. | |
| 8,221,070 B2 | 7/2012 | Baryshnikov | |
| 8,388,740 B2 | 3/2013 | Sohn et al. | |
| 8,602,362 B2 | 12/2013 | Buchwald | |
| 9,334,109 B1 | 5/2016 | Mueller et al. | |
| 2005/0019578 A1 * | 1/2005 | Bosteels | B01D 53/9431 428/408 |
| 2005/0019623 A1 | 1/2005 | Shoji et al. | |
| 2005/0126391 A1 * | 6/2005 | Staroselsky | B01D 19/0031 95/30 |
| 2005/0211096 A1 * | 9/2005 | Burlatsky | B01D 19/0031 96/6 |
| 2005/0217489 A1 * | 10/2005 | Tovar Depablos | B01D 19/0057 96/208 |
| 2005/0274649 A1 | 12/2005 | Spadaccini | |
| 2006/0113248 A1 | 6/2006 | Koenig et al. | |
| 2006/0169138 A1 | 8/2006 | Schmidt | |
| 2006/0278073 A1 | 12/2006 | McHugh | |
| 2007/0163433 A1 * | 7/2007 | Chen | B01D 19/0031 95/46 |
| 2007/0163438 A1 * | 7/2007 | Chiappetta | B01D 19/0042 96/6 |
| 2007/0163439 A1 * | 7/2007 | Coffin | B01D 19/0031 96/6 |
| 2007/0220873 A1 * | 9/2007 | Bosteels | B01D 53/9413 60/299 |
| 2008/0095681 A1 | 4/2008 | Koenig | |
| 2009/0156875 A1 | 6/2009 | Tomioka et al. | |
| 2010/0239954 A1 * | 9/2010 | Dan | H01M 8/0258 429/513 |
| 2010/0294128 A1 * | 11/2010 | Schmidt | B01D 19/0031 95/46 |
| 2011/0033768 A1 * | 2/2011 | Takeguchi | H01M 8/026 429/457 |
| 2011/0131870 A1 | 6/2011 | Poirier et al. | |
| 2012/0118154 A1 | 5/2012 | Wu et al. | |
| 2013/0068660 A1 | 3/2013 | Bergeron et al. | |
| 2013/0219914 A1 | 8/2013 | Budge | |
| 2013/0312376 A1 * | 11/2013 | Huff | F25B 43/00 55/457 |
| 2016/0167802 A1 * | 6/2016 | Lo | B64D 37/34 96/187 |

FOREIGN PATENT DOCUMENTS

| | | |
|---|---|---|
| EP | 0645168 B1 | 6/1997 |
| EP | 1958691 A1 | 8/2008 |
| EP | 1579902 B1 | 2/2009 |
| EP | 2631281 A3 | 9/2013 |
| GB | 735866 A | 8/1955 |
| WO | 9402234 | 2/1994 |
| WO | 02/28714 A1 | 4/2002 |
| WO | 03/024582 A1 | 3/2003 |
| WO | 2013110950 | 8/2013 |

OTHER PUBLICATIONS

EP Extended Search Report for Application No. 16150501.1-1607, dated Jun. 10, 2016.
Johnson et al.; Fuel Deoxygenation and Fuel Tank Inerting System and Method; U.S. Appl. No. 14/310,531, filed Jun. 20, 2014.
Lo et al.; Aircraft Fuel Deoxygenation System; U.S. Appl. No. 14/570,152, filed Dec. 15, 2014.
Lo et al.; Centrifugal Fuel Pump With Variable Pressure Control; U.S. Appl. No. 14/597,938, filed Jan. 15, 2015.
S. Darrah; "Jet Fuel Deoxygenation" DTIC; http://www.dtic.mil/dtic/tr/fulltext/u2/a205006.pdf Oct. 1988.
Patel et al. "Cascade Distillation System" A water recovery system for deep space missions, Jan. 2014, vol. 6, Issue No. 1.
EP Search Report for Application No. 15198311.1-1754, dated May 24, 2016.
E.S. Rosa, et al. "The cyclone gas-liquid separator: operation and mechanistic modeling," IEEE Acal Energy Limited, Aug. 1, 2013.
USPTO Notice of Allowance for U.S. Appl. No. 14/310,531 dated Nov. 14, 2016.
Roan, Melissa A. and Andre L. Boehman, "The Effect of Fuel Composition and Dissolved Oxygen on Deposit Formation from Potential JP-900 Basestocks." American Chemical Society, Apr. 13, 2004.
Deuel, Charles L. "Compact Seawater Deoxygenation System Improvements for Floating Production Facilities," SPE International, SPE 74358, Feb. 10-12, 2002.
Vielvoye, Roger, "World's Largest TLP Moves Onto Deepwater Norwegian Location," Oil and Gas Journal, May 4, 1992.
USPTO Office Action for U.S. Appl. No. 14/597,938 dated Mar. 24, 2017.

* cited by examiner

FUEL DEOXYGENATION SYSTEM CONTACTOR-SEPARATOR

TECHNICAL FIELD

The present invention generally relates to fuel deoxygenation systems, and more particularly relates to a fuel deoxygenation system contactor-separator.

BACKGROUND

Modern aircraft rely on efficient heat sink options for thermal management. The jet fuel that is supplied to the propulsion engines is often a convenient sink for excess thermal energy, and the energy is efficiently retained in the engine thermodynamic cycle. The presence of molecular oxygen or entrained air limits the ability of fuel to absorb heat beyond approximately 300° F. without undergoing deleterious thermal degradation. Thermal degradation often appears as solid materials which adhere to surfaces and degrades fuel system performance increase. Moreover, wetted surfaces comprised of metallic materials can further catalyze the reaction of oxygen with fuel and subsequent formation of carbonaceous, coke-like material.

It is possible to substantially reduce coke-based fuel degradation by removing oxygen from the fuel prior to increasing the fuel temperature beyond about 300° F. Several deoxygenation techniques have been developed. However, these often use equipment that is subject to fouling, which can lead to increased maintenance, and/or process steps that are difficult to control. Moreover, most fuel deoxygenation systems include separate gas/fuel contactors and gas/fuel separators. Presently known contactors and separators are undesirably large in volume and weight.

Therefore, there is a need for a relatively low-maintenance, and/or relatively easy-to-control deoxygenation system that does not rely on relatively large volume and weight contactors and separators. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a fuel deoxygenation system contactor-separator includes a fuel-gas mixture inlet section, a fuel outlet section, a gas outlet, a spiral contactor-separator, and a valve element. The fuel-gas mixture inlet section has a fuel-gas mixture inlet port. The fuel outlet section has a fuel outlet port. The gas outlet section has a gas outlet port. The spiral contactor-separator conduit has an inner wall and an outer wall that defines a spiral contactor-separator flow passage. The spiral contactor-separator conduit is coupled to, and is in fluid communication with, the fuel-gas mixture inlet section, the fuel outlet section, and the gas outlet section. The valve element is disposed between the fuel outlet port and the gas outlet port and is movable between a first position, in which the spiral contactor-separator flow passage is in fluid communication with both the fuel outlet port and the gas outlet port, and a second position, in which the spiral contactor-separator flow passage is in fluid communication with the fuel outlet port and not the gas outlet port.

In another embodiment, a fuel deoxygenation system contactor-separator includes a fuel-gas mixture inlet section, a fuel outlet section, a gas outlet section, a spiral contactor-separator conduit, and a valve element. The fuel-gas mixture inlet section has a fuel-gas mixture inlet port. The fuel outlet section has a fuel outlet port. The gas outlet section has a gas outlet port. The spiral contactor-separator conduit has an inner wall and an outer wall that defines a spiral contactor-separator flow passage. The spiral contactor-separator conduit is coupled to, and is in fluid communication with, the fuel-gas mixture inlet section, the fuel outlet section, and the gas outlet section. The valve element is disposed between the fuel outlet port and the gas outlet port and includes a structure that will float on fuel that is discharged from the fuel outlet port. The valve element is movable between a first position, in which the spiral contactor-separator flow passage is in fluid communication with both the fuel outlet port and the gas outlet port, and a second position, in which the spiral contactor-separator flow passage is in fluid communication with the fuel outlet port and not the gas outlet port. The spiral contactor-separator flow passage has a cross sectional area, and the cross sectional area of at least a portion of the spiral contactor-separator flow passage between the fuel-gas mixture inlet section and the fuel outlet section decreases.

Furthermore, other desirable features and characteristics of the contactor-separator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
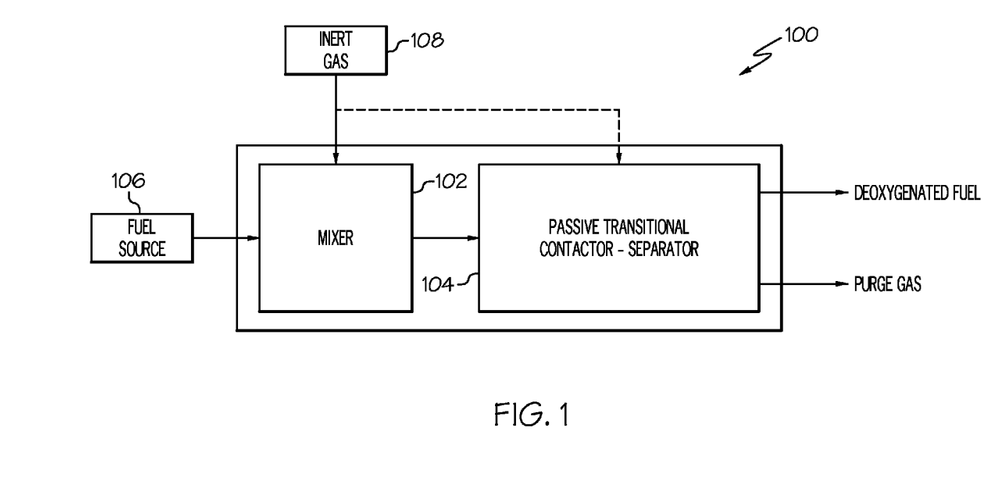
FIG. 1 depicts a simplified schematic representations of one embodiment of a fuel deoxygenation system.

Referring now to FIG. 1, a simplified schematic representation of one embodiment of a fuel deoxygenation system 100 is depicted and includes at least a mixer 102 and a contactor-separator 104. The mixer 102 is coupled to receive fuel from a fuel source 106, and an inert gas from an inert gas source 108. The mixer 102, as is generally known, is configured to mix the fuel and inert gas and supply the fuel-gas mixture to the contactor-separator 104. Preferably, the mixer 102 will uniformly and intimately mix the fuel and inert gas to facilitate the subsequent deoxygenation of the fuel. It will be appreciated that the mixer 102 may be variously implemented using any one of numerous know devices for mixing fuel and gas.

Before proceeding further, it is noted that the fuel deoxygenation system 100 may, in some embodiments, include one or more other components between the mixer 102 and the contactor-separator 104. For example, the system 100 may include one or more heat exchangers and/or one or more filters, just to name a few, between the mixer 102 and the contactor-separator 104. The understanding of these additional components, if included, is not needed to describe or enable the system 100 and will, therefore, not be depicted or described.

Returning once again to FIG. 1 and the description of the depicted system 100, the contactor-separator 104 is coupled to receive the fuel-gas mixture from the mixer 102. The contactor-separator 104 is configured to implement the functions of both a contactor and a separator. As is generally known, a contactor functions to maximize the contact surface to improve mass transfer efficiency, and to provide further mixing of the fuel and inert gas to thereby facilitate efficient transfer of oxygen from the fuel, and a separator functions to separate the deoxygenated fuel and the inert gas/oxygen purge gas that is generated. Some example embodiments of the contactor-separator 104 are depicted in FIGS. 2-8. These embodiments will each be described, beginning first with the embodiment depicted in FIGS. 2-5. It is noted that the embodiments described herein are not configured to achieve relatively high percentage of separation, but a relatively rough percentage of separation. Further separation, if needed, may be provided downstream of the depicted and described contactor-separator 104.

Figure 2:
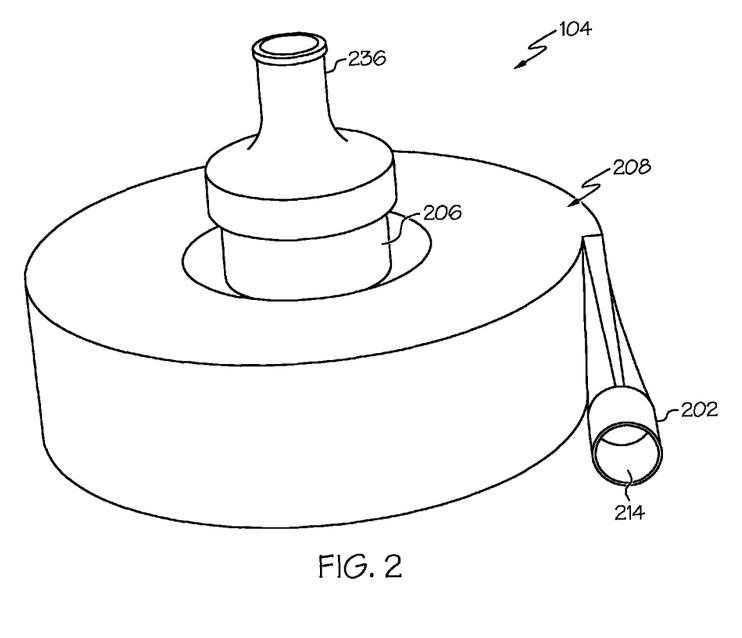
FIGS. 2-5 depict various views of one exemplary embodiment of a contactor-separator that may be used to implement the system of FIG. 1.
Figure 3:
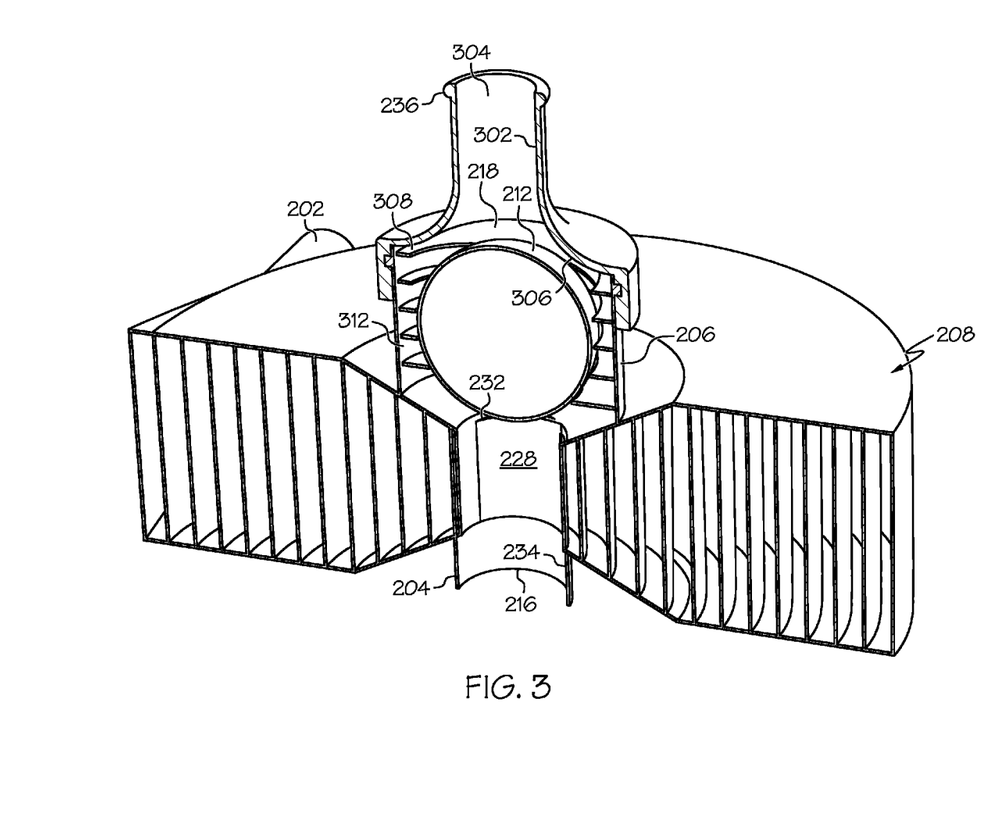
Figure 4:
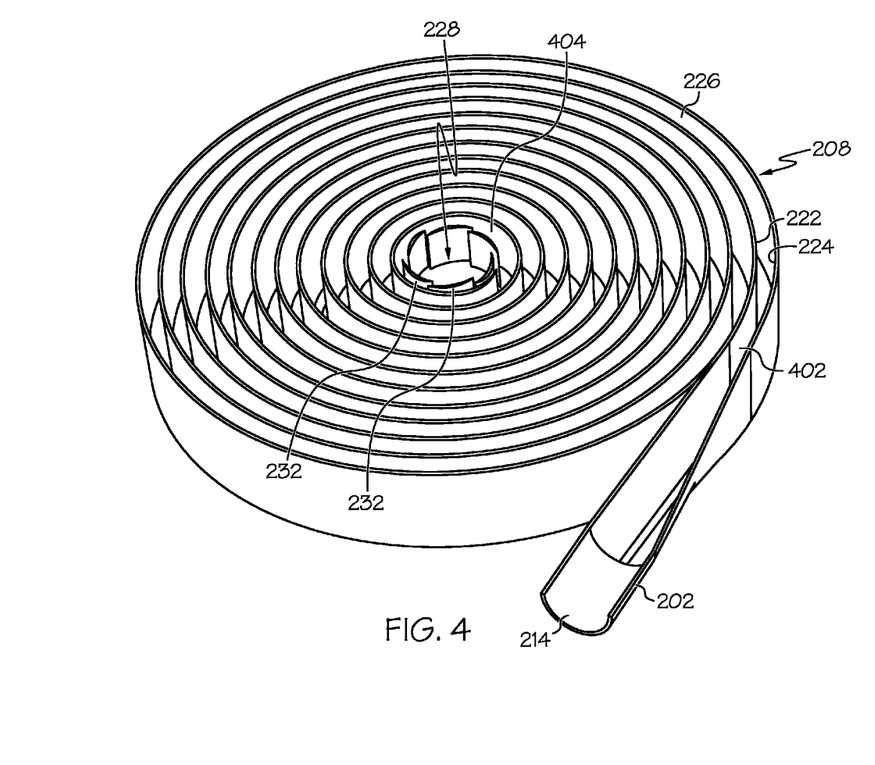

The contactor-separator 104 includes a fuel-gas mixture inlet section 202, a fuel outlet section 204 (see FIG. 3), a gas outlet section 206, a spiral contactor-separator conduit 208, and a valve element 212 (see FIG. 3). The fuel-gas mixture inlet section 202 has a fuel-gas mixture inlet port 214 that receives the fuel-gas mixture from the mixer 102. The fuel outlet section 204, which is shown more clearly in FIG. 3, has a fuel outlet port 216, through which the deoxygenated fuel is discharged, and the gas outlet section 206 has a gas outlet port 218, through which the inert gas/oxygen purge gas is discharged.

The spiral contactor-separator conduit 208 is coupled to, and is in fluid communication with, the fuel-gas mixture inlet section 202, the fuel outlet section 204, and the gas outlet section 204. As shown more clearly in FIG. 4, the spiral contactor-separator conduit 208 has an inner wall 222 and an outer wall 224 that together define a spiral contactor-separator flow passage 226. As FIG. 4 also depicts, the spiral contactor-separator flow passage 226 has a flow passage inlet port 402 and a flow passage outlet port 404, and decreases in radius between the flow passage inlet port 402 and the flow passage outlet port 404.

Figure 5:
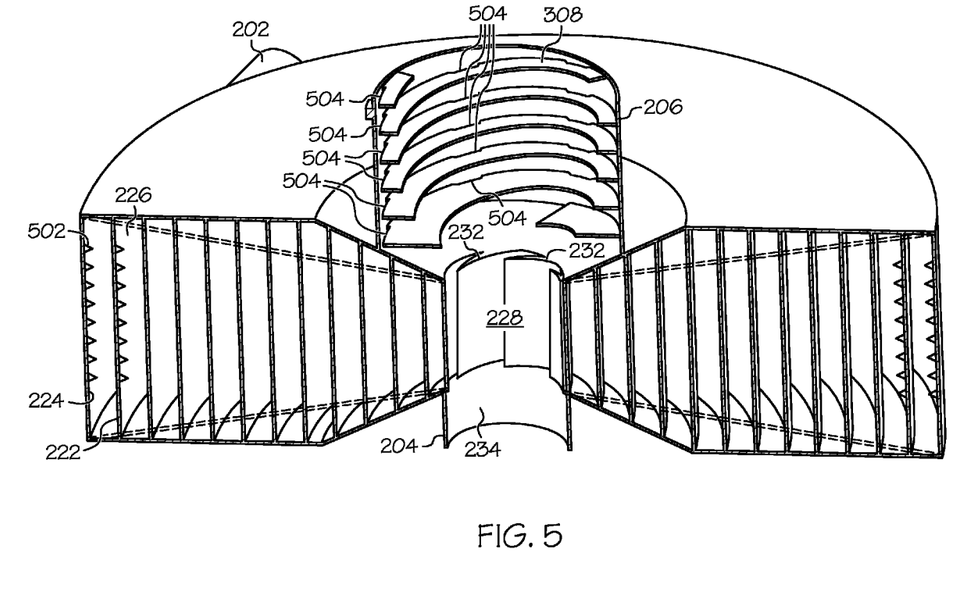

Referring now to FIG. 5, the spiral contactor-separator flow passage 226 has a cross sectional area. Preferably, the cross section area of at least a portion of the spiral contactor-separator flow passage 226 between the fuel-gas mixture inlet section 202 and the fuel outlet section 204 decreases. Although only a portion of the spiral contactor-separator flow passage 226 decreases in cross section in the embodiment depicted in FIGS. 2-5, in some embodiments, such as the one depicted in FIGS. 6-8, and as shown in phantom in FIG. 5, the entirety of the spiral contactor-separator flow passage 226 may gradually decrease in cross section. Although in the depicted embodiments the cross section of the spiral contactor-separator flow passage 226 decreases by decreasing the height of the spiral contactor-separator flow passage 226, in other embodiments the width could instead (or also) be varied. The variation in cross section serves to accelerate the fluid velocity for separation.

The contactor-separator 104 may additionally include, at least in the embodiment depicted in FIGS. 2-5, a plurality of protrusions 502 (see FIG. 5), such as fins or vanes. These protrusions 502, which function as turbulators, are formed on at least a portion of the outer wall 224. The turbulators 502, which convert laminar flow into turbulent flow, are optimally placed, preferably along the outer wall 224 of the outer few laps of the spiral contactor-separator flow passage 226 to maintain the gas bubbles in suspension for a prolonged contact time, as needed.

The depicted contactor-separator 104 also includes what is referred to herein as a separation chamber 228. The separation chamber 228 is in fluid communication with the spiral contactor-separator flow passage 226, the fuel outlet section 204, and the gas outlet section 206. The separation chamber 228 includes a plurality of exit diffusers 232, each of which is disposed tangent to the spiral contactor-separator flow passage 226. The exit diffusers 232 are configured to guide the deoxygenated fuel exiting the spiral contactor-separator flow passage 226 against an inner wall 234 of the fuel outlet section 204 and out the fuel outlet port 216. The exit diffusers 232 also allow the inert gas/oxygen purge gas exiting the spiral contactor-separator flow passage 226 to flow around the valve element 212, into the gas outlet section 206, and out the gas outlet port 218.

The valve element 212, as shown most clearly in FIG. 3, is movably disposed within the contactor-separator 104 between the fuel outlet port 216 and the gas outlet port 218, and is maintained within the contactor-separator 212 via a cap 236. The cap 236, which sealingly engages the gas outlet section 206, includes an inner surface 302 that defines a cap flow passage 304 and a valve seat 306. The cap flow passage 304 allows gas that accumulates in the gas outlet section 206 (as described further below) to flow out the gas outlet port 218 and through the cap flow passage 304. The valve seat 306, as will now be explained, is selectively engaged and disengaged by the valve element 212.

The valve element 212, as noted above, is movably disposed within the contactor-separator 104. In particular, the valve element 212 is movable between a first position, which is the position depicted in FIG. 3, and a second position (not depicted). When the valve element 212 is in the first position it does not engage the valve seat 308, and the spiral contactor-separator flow passage 226 is in fluid communication with both the fuel outlet port 216 and the gas outlet port 218. In the second position, the valve element 212 engages the valve seat 306, and the spiral contactor-separator flow passage 226 is in fluid communication with the fuel outlet port 216 and not the gas outlet port 218. The valve element 212 preferably comprises a structure that will float on the fuel. In the depicted embodiment, the valve element 212 is a hollow, spherically shaped metal structure, but it could comprise any one of numerous suitable materials.

With continued reference to FIG. 3, it is seen that the contactor-separator 104 also preferably includes a valve element guide structure 308. The valve element guide structure 308, when included, is coupled to, and extends radially inwardly from, an inner surface 312 of the gas outlet section 206, and the valve element 212 is disposed within the valve element guide structure 308. The valve element guide structure 308 may be variously configured, but in the depicted embodiment it is configured as a helical structure that extends along the length of the gas outlet section 206. As shown more clearly in FIG. 5, a plurality of drain orifices 504 may be formed in and extend through the valve element guide structure 308. These drain orifices 504, which may be variously disposed and shaped, allow fuel droplets that may be suspended within the inert gas/oxygen purge gas to drain into the fuel outlet section 204.

The continuous spiral contactor-separator flow passage 226, as noted above and as depicted in FIGS. 2-5, decreases in radius between the flow passage inlet port 402 and the flow passage outlet port 404. Thus, the fuel-gas mixture enters the contactor-separator 104 tangentially and continues the contacting process as it flows towards the center. As the turning radius of the spiral contactor-separator flow passage 226 reduces and, at least in some embodiments, the cross sectional flow area decreases, the radial acceleration increases of the fuel-gas mixture increases. Due to the differences in density, the gas (e.g., $N_2$, $O_2$) will coalesce and separate towards the inner wall 222. It should be noted that the separation drive (radial acceleration) at the center of the contactor-separator 104 can be an order of magnitude greater than what it is at the outer periphery.

As the fuel and gas stream reaches the center, it is guided through the plurality of exit diffusers 232 into the separation chamber 228. From there, the fuel will spiral down into the fuel outlet section 204 and out the fuel outlet port 216. The gas will rise into the gas outlet section 206, swirl around the valve element 212, and exit out the gas outlet port 218. If the gas volume in the system 100 decreases, the fuel level will rise to move the valve element to the second position. Therefore, no fuel will flow out the gas outlet port 218.

Figure 6:
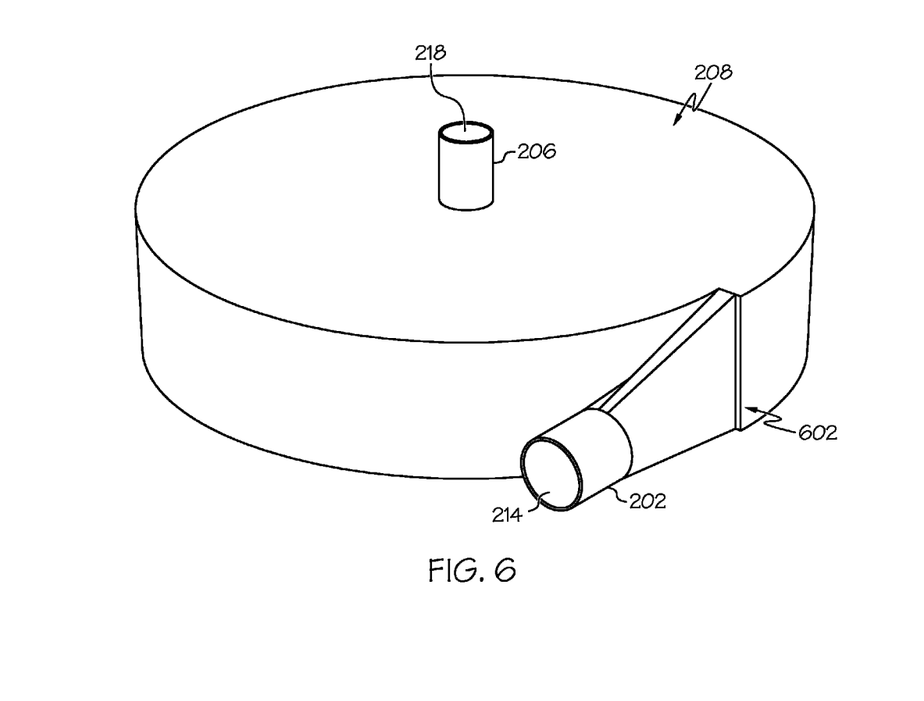
FIGS. 6-10 depict various views of another exemplary embodiment of a contactor-separator that may be used to implement the system of FIG. 1.
Figure 7:
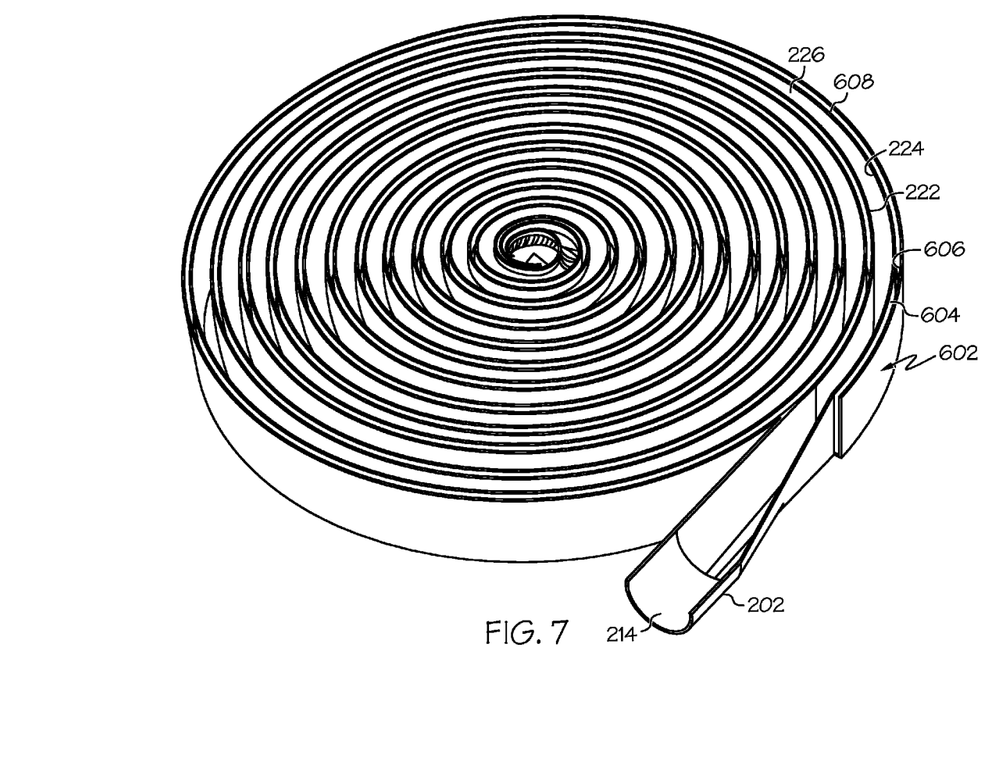
Figure 8:
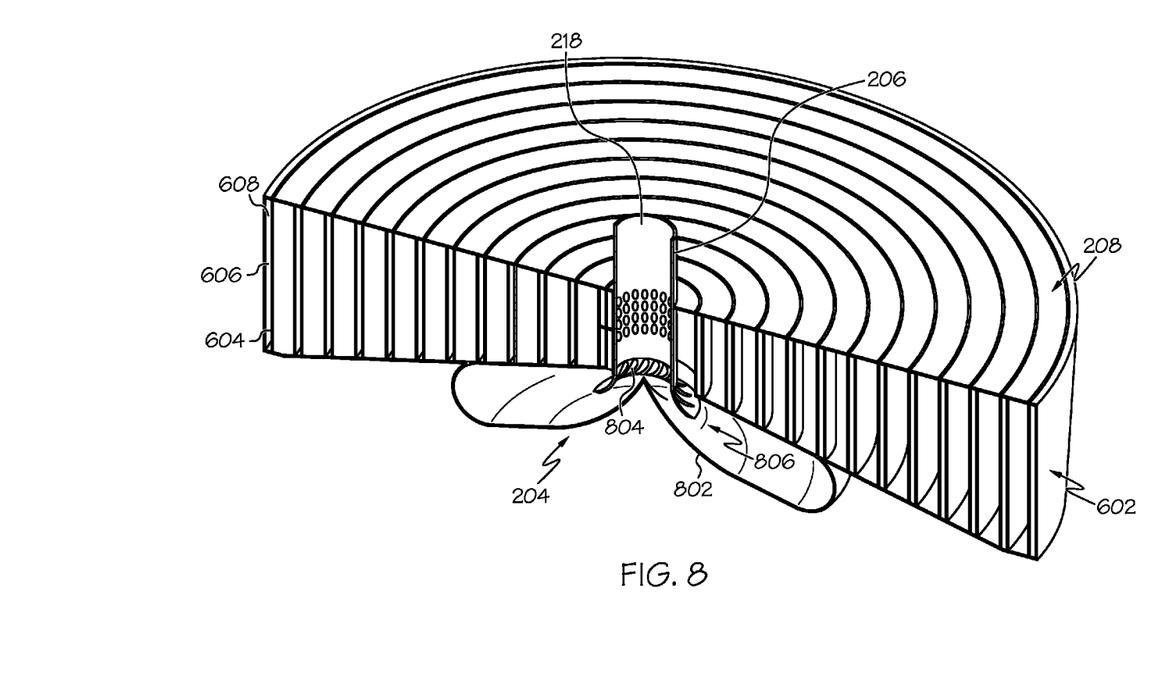

In some embodiments, the contactor-separator 104 additionally includes a spiral inert gas conduit. One such embodiment is depicted in FIGS. 6-8, and will now be described. In doing so, it is noted that like reference numerals used in FIGS. 6-8 refer to like components to those depicted in FIGS. 2-5. Descriptions of these like components will, therefore, not be repeated. It is noted that the fuel outlet section 204 of the embodiment depicted in FIGS. 6-10 is shaped and configured differently than the embodiment depicted in FIGS. 2-5, and will thus be described.

In the depicted embodiment, the spiral inert gas conduit 602 is disposed adjacent to the spiral contactor-separator conduit 208. The spiral inert gas conduit 602 has an inner wall 604 and an outer wall 606 that defines a spiral inert gas flow passage 608. The spiral inert gas flow passage 608 is disposed adjacent to the spiral contactor-separator flow passage 226. As may be readily apparent from at least FIG. 7, the outer wall 224 that defines the spiral contactor-separator flow passage 226 is also the inner wall 604 that defines the spiral inert gas flow passage 608. Moreover, a portion of the outer wall 606 that defines the spiral inert gas flow passage 608 is also the inner wall 222 that defines the spiral contactor-separator flow passage 226.

At least a portion of the spiral inert gas flow passage 608 is in fluid communication with the spiral contactor separator flow passage 226. Preferably, this fluid communication is provided by forming a plurality of orifices in the outer wall 224 that defines the spiral contactor-separator flow passage 226. Thus, during operation, fresh inert gas may be injected into the fuel-gas stream along the pressure side of the spiral contactor-separator flow passage 226 to further enhance deoxygenation.

As noted above, the fuel outlet section 204 in the embodiments depicted in FIGS. 6-10 is also configured differently than the embodiments depicted in FIGS. 2-5. In particular, instead of the separation chamber 208, the depicted contactor-separators 104 include what is referred to herein as a separation basin 802. The separation basin 802 is in fluid communication with the spiral contactor-separator flow passage 226, the spiral inert gas flow passage 608, the fuel outlet section 204, and the gas outlet section 206.

Figure 9:
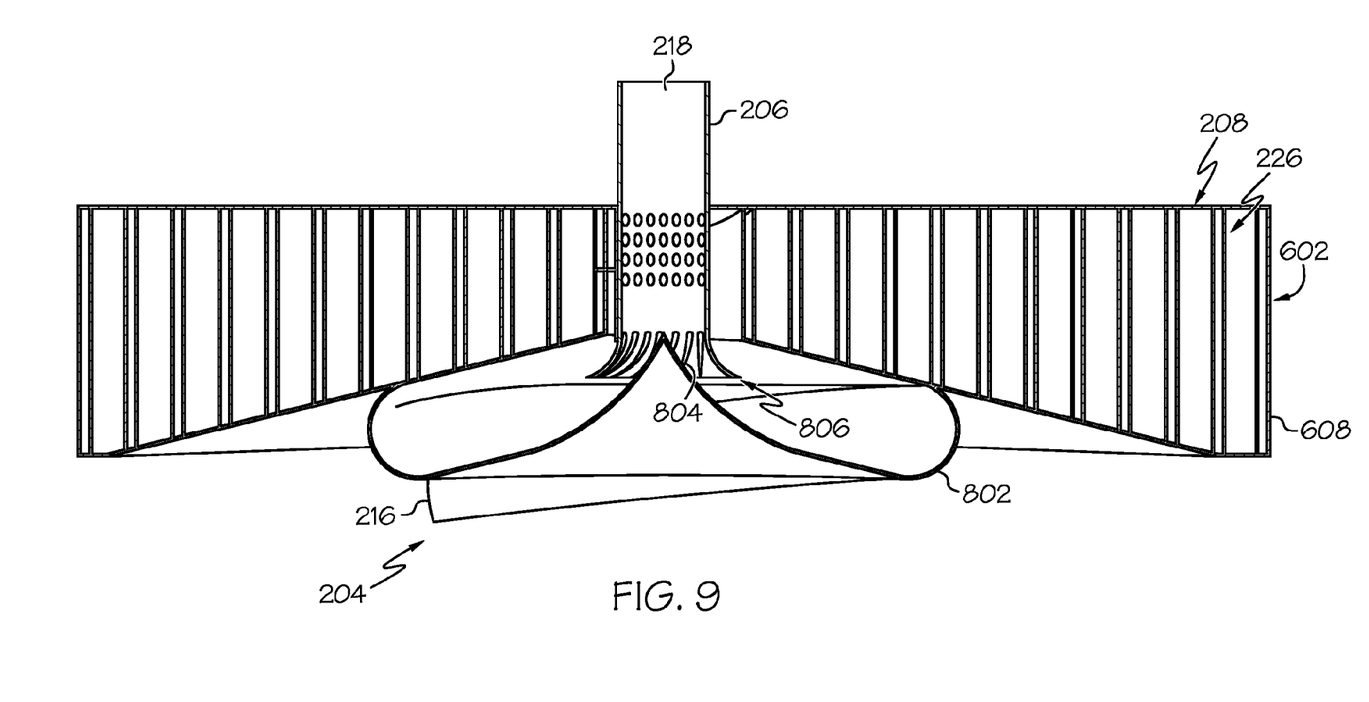
Figure 10:
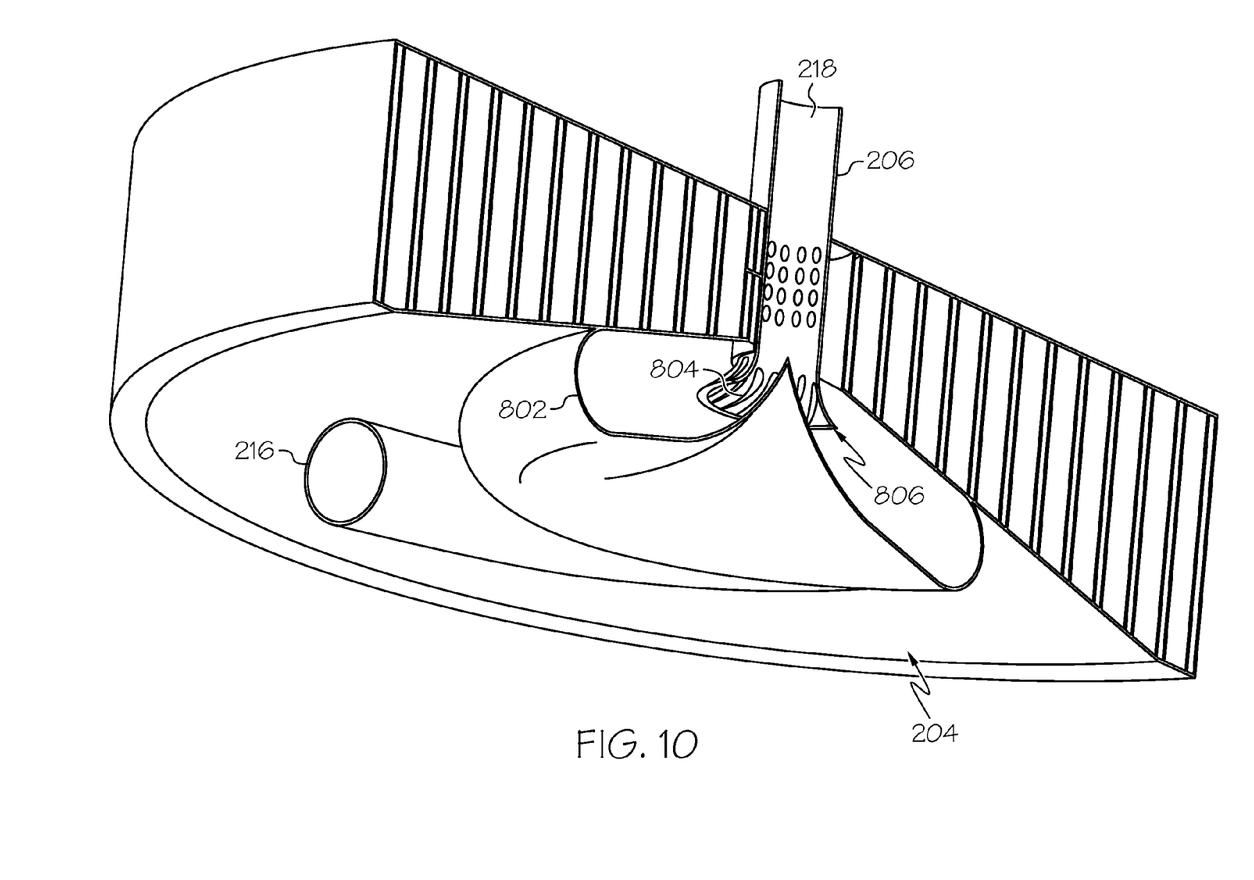

As FIGS. 8-10 also depict, the heights of the spiral contactor-separator flow passage 226 and the spiral inert gas flow passage 608 gradually decrease as each approaches the separation chamber 802. Moreover, the bottoms (or floors) of these flow passages 226, 608 open up. This configuration helps in the separation of the fluid and gas. In addition, as the fuel and inert gas are discharged from the spiral contactor-separator flow passage 226 and the spiral inert gas flow passage 608, a portion of the fuel and inert gas may pass through a plurality of slots 804 that are formed in a bell-mouth portion 806 of the gas outlet section 206. These slots 804 may further assist in the separation of the fuel and gas.

As the fuel enters the separation chamber 802 it is dispersed outwardly, while the purge gas is directed into and through the bellmouth, and into the gas outlet section 206. The fuel circulates around the outer periphery of the separation chamber 802 and is discharged out the fuel outlet port 216. Although the embodiments depicted in FIGS. 6-10 do not depict the valve element 212, it will be appreciated that these embodiments may also, and indeed preferably, include the valve element 212.

It should be noted that the embodiments depicted in FIGS. 2-5 could be configured with the fuel outlet section 204 depicted in FIGS. 6-10, and the embodiments depicted in FIGS. 6-10 could be configured with the fuel outlet section 204 depicted in FIGS. 2-5. Moreover, various features included in the embodiments depicted in FIGS. 2-5, but not depicted in the embodiments depicted in FIGS. 6-10, could be included, if needed or desired, in the embodiments depicted in FIGS. 6-10. Similarly, various features included in the embodiments depicted in FIGS. 6-10, but not included in the embodiments depicted in FIGS. 2-5, could be included, if needed or desired, in the embodiments depicted in FIGS. 2-5.

Figure 11:
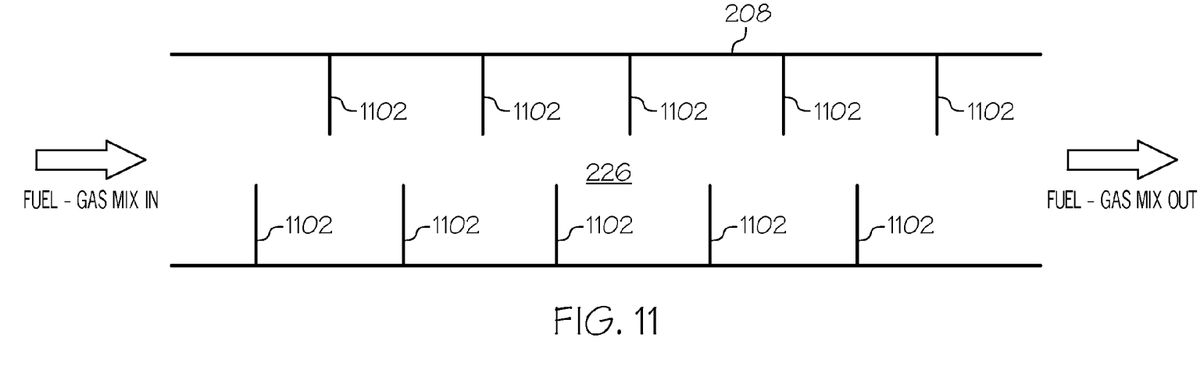
FIGS. 11 and 12 depict simplified one-dimensional side views of a portion of a spiral contactor-separator flow passage that may be included in the contactor-separators depicted in FIGS. 2-10.
Figure 12:
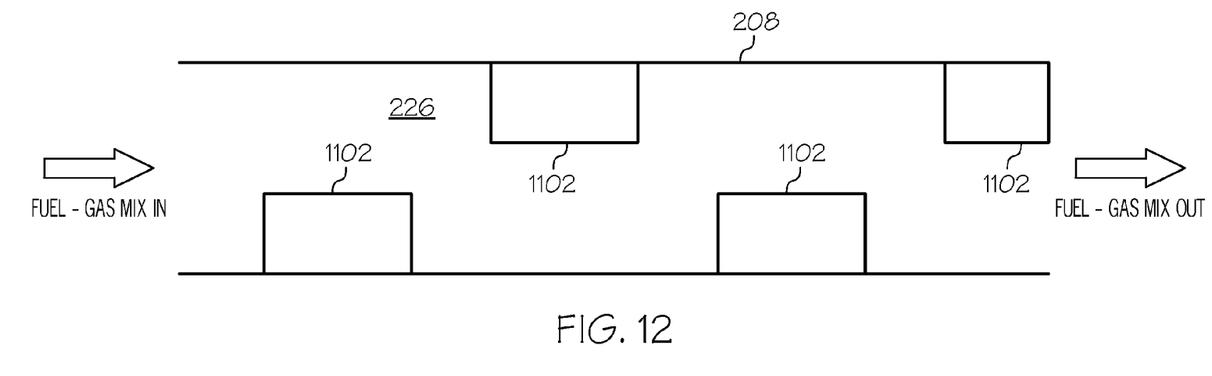

Finally, one or more of the embodiments depicted in FIGS. 2-10 could have structural features extending into the spiral contactor-separator flow passage 226. These structural features, if included, could be formed in only a portion of the spiral contactor-separator flow passage 226, at a plurality of locations in the spiral contactor-separator flow passage 226, or along the entirety of the contactor separator spiral flow passage 226. Regardless, and as shown in FIGS. 11 and 12, which are one-dimensional side views of a portion of the spiral contactor-separator flow passage 226, the structural features 1102 extend into the flow passage 226 to create a relatively tortuous path. The tortuous path will not only continuously mix the fuel and gas, but will also increase the time for the fuel-gas mixture to reach the center of the spiral contactor-separator flow passage 226. The structural features, as FIGS. 11 and 12 depict, may be variously shaped, and may extend from the top, bottom, or sides of the flow passage 226.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel deoxygenation system contactor-separator, comprising:
    a fuel-gas mixture inlet section having a fuel-gas mixture inlet port;
    a fuel outlet section having a fuel outlet port;
    a gas outlet section having a gas outlet port;
    a spiral contactor-separator conduit having an inner wall and an outer wall that defines a spiral contactor-separator flow passage, the spiral contactor-separator conduit coupled to, and in fluid communication with, the fuel-gas mixture inlet section, the fuel outlet section, and the gas outlet section; and
    a valve element disposed between the fuel outlet port and the gas outlet port and movable between a first position, in which the spiral contactor-separator flow passage is in fluid communication with both the fuel outlet port and the gas outlet port, and a second position, in which the spiral contactor-separator flow passage is in fluid communication with the fuel outlet port and not the gas outlet port,
    wherein:
        the spiral contactor-separator flow passage includes a flow passage inlet port and a flow passage outlet port; and
        the spiral contactor-separator flow passage decreases in radius between the flow passage inlet port and the flow passage outlet port.

2. The contactor separator of claim 1, wherein:
    the spiral contactor-separator flow passage has a cross sectional area; and
    the cross section area of at least a portion of the spiral contactor-separator flow passage between the fuel-gas mixture inlet section and the fuel outlet section decreases.

3. The contactor-separator of claim 1, further comprising a plurality of turbulators formed on at least a portion of the outer wall.

4. The contactor-separator of claim 1, further comprising:
    a separation chamber in fluid communication with the spiral contactor-separator flow passage, the fuel outlet section, and the gas outlet section, the separation chamber including a plurality of exit diffusers, each exit diffuser disposed tangent to the spiral flow passage and configured to (i) guide fuel exiting the spiral contactor-separator flow passage against an inner wall of the fuel outlet section and out the fuel outlet port, and (ii) allow gas exiting the spiral contactor-separator flow passage to flow toward the gas outlet port.

5. The contactor-separator of claim 1, further comprising:
    a separation basin in fluid communication with the spiral contactor-separator flow passage, the spiral inert gas flow passage, and the gas outlet section,
    wherein at least the spiral contactor-separator flow passage gradually decreases in height as it approaches the separation chamber, and a bottom of the spiral contactor-separator flow passage adjacent to the separation chamber opens up.

6. The contactor-separator of claim 5, wherein:
    the gas outlet section includes a bellmouth section that extends into the separation chamber; and
    a plurality of slots are formed in the bellmouth section.

7. The contactor-separator of claim 1, further comprising:
    a valve element guide structure coupled to, and extending radially inwardly from, an inner surface of the gas outlet section,
    wherein the valve element is disposed within the valve element guide structure, and comprises a structure that will float on fuel that is discharged from the fuel outlet port.

8. The contactor-separator of claim 7, wherein:
    the valve element guide structure is configured as a helical structure; and
    a plurality of drain orifices extend through the valve element guide structure.

9. A fuel deoxygenation system contactor-separator, comprising:
    a fuel-gas mixture inlet section having a fuel-gas mixture inlet port;
    a fuel outlet section having a fuel outlet port;
    a gas outlet section having a gas outlet port;
    a spiral contactor-separator conduit having an inner wall and an outer wall that defines a spiral contactor-separator flow passage, the spiral contactor-separator conduit coupled to, and in fluid communication with, the fuel-gas mixture inlet section, the fuel outlet section, and the gas outlet section; and
    a valve element disposed between the fuel outlet port and the gas outlet port and comprising a structure that will float on fuel that is discharged from the fuel outlet port, the valve element movable between a first position, in which the spiral contactor-separator flow passage is in fluid communication with both the fuel outlet port and the gas outlet port, and a second position, in which the spiral contactor-separator flow passage is in fluid communication with the fuel outlet port and not the gas outlet port,
    wherein:
        the spiral contactor-separator flow passage has a cross sectional area; and the cross sectional area of at least a portion of the spiral contactor-separator flow passage between the fuel-gas mixture inlet section and the fuel outlet section decreases.

10. The contactor-separator of claim 9, wherein
the spiral contactor-separator flow passage includes a flow passage inlet port and a flow passage outlet port; and
the spiral contactor-separator flow passage decreases in radius between the flow passage inlet port and the flow passage outlet port.

11. The contactor-separator of claim 9, wherein:
the spiral contactor-separator flow passage includes an inner wall and an outer wall; and
the contactor-separator further comprises a plurality of turbulators formed on at least a portion of the outer wall.

12. The contactor-separator of claim 9, further comprising:
a separation chamber in fluid communication with the spiral contactor-separator flow passage , the fuel outlet section, and the gas outlet section, the separation chamber including a plurality of exit diffusers, each exit diffuser disposed tangent to the spiral flow passage and configured to (i) guide fuel exiting the spiral contactor-separator flow passage against an inner wall of the fuel outlet section and out the fuel outlet port, and (ii) allow gas exiting the spiral contactor-separator flow passage to flow toward the gas outlet port.

13. The contactor-separator of claim 9, further comprising:
an spiral inert gas conduit disposed adjacent to the spiral contactor-separator conduit, the spiral inert gas conduit including an spiral inert gas flow passage that is disposed adjacent to the spiral contactor-separator flow passage, at least a portion of the spiral inert gas flow passage in fluid communication with the contactor separator spiral flow passage,
wherein:
the outer wall that defines the spiral contactor-separator flow passage has a plurality of orifices formed therein;
the outer wall that defines the spiral contactor-separator flow passage also functions as an inner wall that defines the spiral inert gas flow passage; and
the inner wall that that defines the spiral contactor-separator flow passage also functions as a portion of an outer wall that defines the spiral inert gas flow passage.

14. The contactor-separator of claim 9, further comprising:
a separation basin in fluid communication with the spiral contactor-separator flow passage, the spiral inert gas flow passage, and the gas outlet section,
wherein:
at least the spiral contactor-separator flow passage gradually decreases in height as it approaches the separation chamber, and a bottom of the spiral contactor-separator flow passage adjacent to the separation chamber opens up,
the gas outlet section includes a bellmouth section that extends into the separation chamber, and
a plurality of slots are formed in the bellmouth section.

15. A fuel deoxygenation system contactor-separator, comprising:
a fuel-gas mixture inlet section having a fuel-gas mixture inlet port;
a fuel outlet section having a fuel outlet port;
a gas outlet section having a gas outlet port;
a spiral contactor-separator conduit having an inner wall and an outer wall that defines a spiral contactor-separator flow passage, the spiral contactor-separator conduit coupled to, and in fluid communication with, the fuel-gas mixture inlet section, the fuel outlet section, and the gas outlet section;
a valve element disposed between the fuel outlet port and the gas outlet port and movable between a first position, in which the spiral contactor-separator flow passage is in fluid communication with both the fuel outlet port and the gas outlet port, and a second position, in which the spiral contactor-separator flow passage is in fluid communication with the fuel outlet port and not the gas outlet port; and
a spiral inert gas conduit disposed adjacent to the spiral contactor-separator conduit, the spiral inert gas conduit having an inner wall and an outer wall that defines a spiral inert gas flow passage that is disposed adjacent to the spiral contactor-separator flow passage, at least a portion of the spiral inert gas flow passage in fluid communication with the contactor separator spiral flow passage.

16. The contactor-separator of claim 15, wherein:
the outer wall that defines the spiral contactor-separator flow passage has a plurality of orifices formed therein; and
the outer wall that defines the spiral contactor-separator flow passage is also the inner wall that defines the spiral inert gas flow passage.

17. The contactor-separator of claim 15, further comprising:
a separation chamber in fluid communication with the spiral contactor-separator flow passage, the fuel outlet section, and the gas outlet section, the separation chamber including a plurality of exit diffusers, each exit diffuser disposed tangent to the spiral flow passage and configured to (i) guide fuel exiting the spiral contactor-separator flow passage against an inner wall of the fuel outlet section and out the fuel outlet port, and (ii) allow gas exiting the spiral contactor-separator flow passage to flow toward the gas outlet port.

18. The contactor-separator of claim 15, further comprising:
a separation basin in fluid communication with the spiral contactor-separator flow passage, the spiral inert gas flow passage, and the gas outlet section,
wherein at least the spiral contactor-separator flow passage gradually decreases in height as it approaches the separation chamber, and a bottom of the spiral contactor-separator flow passage adjacent to the separation chamber opens up.

19. The contactor-separator of claim 18, wherein:
the gas outlet section includes a bellmouth section that extends into the separation chamber; and
a plurality of slots are formed in the bellmouth section.

* * * * *